United States Patent [19]

Lundberg et al.

[11] Patent Number: 4,489,180
[45] Date of Patent: Dec. 18, 1984

[54] DRAG REDUCTION AGENT UTILIZING WATER SOLUBLE INTERPOLYMER COMPLEXES

[75] Inventors: Robert D. Lundberg, Bridgewater; Dennis G. Peiffer, East Brunswick; Ilan Duvdevani, Leonia; Ralph M. Kowalik, Bridgewater, all of N.J.

[73] Assignee: Exxon Research and Engineering Co., Florham Park, N.J.

[21] Appl. No.: 560,515

[22] Filed: Dec. 12, 1983

[51] Int. Cl.$^3$ .......................... B63B 1/34; C09K 3/00; C09K 7/02

[52] U.S. Cl. ......................... 523/175; 260/DIG. 31; 252/8.5 C; 524/501; 524/504; 524/516; 524/521; 524/800; 524/803; 524/804; 524/832; 525/203; 525/919

[58] Field of Search .............. 260/DIG. 31; 523/175; 524/800, 803, 804, 832, 501, 504, 516, 521; 525/203, 919; 252/8.5 C

[56] References Cited

U.S. PATENT DOCUMENTS

| | | | |
|---|---|---|---|
| 3,432,454 | 3/1969 | Hibbard | 524/501 |
| 3,454,676 | 7/1969 | Busse | 260/DIG. 31 |
| 3,546,142 | 12/1970 | Michaels et al. | 524/501 |
| 3,660,338 | 5/1972 | Economou | 524/501 |
| 3,779,969 | 12/1973 | Slagel et al. | 523/175 |
| 3,867,330 | 2/1975 | Frisque | 524/521 |
| 3,868,432 | 2/1975 | Keegan et al. | 524/516 |
| 3,926,890 | 12/1975 | Huang et al. | 524/832 |
| 3,969,434 | 7/1976 | Powell et al. | 260/DIG. 31 |
| 4,040,984 | 8/1977 | Sharpe et al. | 524/521 |
| 4,088,623 | 5/1978 | Pearl | 523/175 |
| 4,134,870 | 1/1979 | Makowski et al. | 260/DIG. 31 |
| 4,145,379 | 3/1979 | Lundberg et al. | 260/DIG. 31 |
| 4,151,137 | 4/1979 | Duvdevani et al. | 260/DIG. 31 |
| 4,153,055 | 5/1979 | Etes | 524/521 |
| 4,196,236 | 4/1980 | Lundberg et al. | 260/DIG. 31 |

FOREIGN PATENT DOCUMENTS

| | | | |
|---|---|---|---|
| 1054784 | 5/1979 | Canada | 523/175 |

*Primary Examiner*—Ronald W. Griffin
*Attorney, Agent, or Firm*—Richard E. Nanfeldt

[57] ABSTRACT

The present invention discloses a class of water soluble complex polymers of relatively low molecular weight, which have been found to be improved drag reducing agents. These complex polymers are a mixture of a cationic copolymer having a water soluble polymer backbone and an anionic copolymer having a water soluble polymer backbone. The solutions of these complex polymers are improved drag reducing agents for aqueous systems at low concentrations (i.e., 10 to 500 ppm) relative to individual solutions of the copolymers which make upon the polymer complex.

10 Claims, No Drawings

DRAG REDUCTION AGENT UTILIZING WATER SOLUBLE INTERPOLYMER COMPLEXES

FIELD OF THE INVENTION

The present invention discloses a class of water soluble interpolymer complexes of relatively low molecular weight, which have been found to be improved drag reducing agents. These interpolymer complexes are a mixture of a cationic copolymer having a water soluble polymer backbone and a anionic copolymer having a water soluble polymer backbone. The solutions of these interpolymer complexes are improved drag reducing agents for aqueous systems at low concentrations (i.e., 10 to 500 ppm) relative to individual solutions of the copolymers which make up the polymer complex.

Numerous U.S. patents have taught methods for preparing ion containing polymers such as sulfonating a variety of elastomeric and thermoplastic polymers. These U.S. patents are: U.S. Pat. Nos. 3,642,728; 3,836,511; 3,072,618; 3,072,619; 3,847,854; 3,870,841 and 3,877,530. However, none of these references teach the process for preparing the polymer complexes of the instant invention, nor do they recognize that complex polymers of this class are effective drag reducing agents for aqueous solutions.

BACKGROUND OF THE INVENTION

To flow liquids in pipes, energy must be expended to overcome frictional losses. This energy is extracted from the liquid pressure, which decreases along the pipe in the direction of flow. For a fixed pipe diameter, these pressure drops increase with increasing flow rate until a maximum is reached when the pressure drop along the pipe equals the supply pressure at the beginning of the pipe. When flow in the pipe is turbulent (flow Reynolds number = mean fluid velocity × pipe diameter ÷ fluid kinematic viscosity greater than about 2000) this maximum flow rate can be increased by the addition of small amounts of certain high molecular weight linear polymers to the liquid. These polymers interact with the turbulent flow processes and reduce frictional pressure losses such that the pressure drop for a given flow rate is less, or the maximum flow rate for a given pressure drop is larger. This phenomenon is commonly called drag reduction. It has been used in commercial oil pipeline, fire hoses and storm sewers to increase the flow capacities of existing systems. It can also be used to reduce supply pressures, pumping costs, and/or pipe diameters for given flow capacities.

The instant invention discloses new efficient drag reduction agents in aqueous liquids which are a novel class of interpolymer complexes of acrylamide/metal styrene sulfonate and acrylamide/methacrylamidopropyltrimethylammonium chloride.

We note that high molecular weight polymeric materials in general, are considered useful as drag reduction agents when dissolved in an appropriate solvent system. For example, very high molecular weight water soluble polymers such as polyethylene oxide (PEO), polyacrylamide (PAM) and partially hydrolyzed polyacrylamide (HPAM) have been demonstrated to reduce drag in turbulent flow of aqueous liquid. The major reason for this reduction in fluid drag is due in large part to the very large dimensions of the individual polymer chain as compared to the dimension of the single solvent molecules. Any increase in size of the polymer chain will produce a corresponding enhancement in the drag reduction. This effect is maximized, when the polymer is dissolved in a "good" solvent. Therefore, in general, a hydrocarbon soluble polymer is useful in hydrocarbon solvents while a water soluble polymer is useful in aqueous systems. With regard to aqueous systems, polyelectrolytes are very useful and the most commonly used materials. However, it is generally quite difficult from a synthetic viewpoint to form a high or ultrahigh molecular weight water soluble polymer. This is due in part to both the presence of minutes amounts of impurities in the monomer feed which terminate the polymerization sequence and the very substantial shear sensitivity of these materials. Relatively small shear streeses are capable of causing severe deterioration in these high molecular weight polymers.

The instant invention discloses that interpolymer complexes, composed of an anionic copolymer and a cationic copolymer can be useful as drag reduction agents for aqueous solution systems, as an alternative to very high molecular weight polymers.

The anionic and cationic units need not be present in an aquimolar amount.

Typical water soluble monomers incorporated into the copolymers that are envisioned in the present invention are listed as follows:

Anionic: 2-acrylamido-2-methylpropane sulfonic acid, sodium styrene sulfonate, (meth)acrylic acid, 2-sulfoethylmethacrylate, and the like.

Cationic: methacrylamidopropyltrimethylammonium chloride, dimethyldiallylammonium chloride, diethyldiallylammonium chloride, 2-methacryloxy-2-ethyltrimethylammonium chloride, trimethylmethacryloxyethylammonium methosulfate, 2-acrylamido-2-methylpropyltrimethylammonium chloride, vinylbenzyltrimethylammonium chloride, and the like.

Nonionic: acrylamide, (N,N-dimethyl)acrylamide, hydroxyethyl(meth)acrylate, alkyl substituted acrylamides, (meth)acrylates, N-vinyllactones (e.g., n-vinyl-2pyrrolidone), and the like.

These monomers posses the appropriate water solubility for polymerization to take place.

The instant invention discloses that these interpolymer complexes can be usefuel as drag reduction agents for multicomponent aqueous solutions, e.g., well control and workover fluids, marine applications, blood and the like. In the latter fluid, addition of the interpolymer complex will enhance the blood flow rate through the circulation system of the living species through the circulation system of the living species (animal or homosapiens). In most instances, this would have a beneficial effect on the organism, such as enhancing the rate blood can carry oxygen, medicines, nutrients and the like to an organ. Similar enhancements would be observed with regard to fluid circulation in plants.

SUMMARY OF THE INVENTION

The present invention relates to improved drag reduction agents for an aqueous solution. These agents are typically water soluble anionic copolymers intimately mixed with water soluble cationic copolymers to form an interpolymer complex. These individual copolymers are formed by a free radical copolymerization of a nonionic monomer with either an anionic or cationic monomer.

Typical, but not limiting anionic copolymer structures are formed by the copolymerization of acrylamide monomer and sodium styrene sulfonate. Typical, but not limiting cationic copolymer structures are formed by the copolymerization of acrylamide and methacrylamidopropyltrimethylammonium chloride.

To flow liquids in pipes, energy must be expended to overcome frictional losses. This energy is extracted from the liquid pressure, which decreases along the pipe in the direction of flow. For a fixed pipe diameter, these pressure drops increase with increasing flow rate until a maximum is reached when the pressure drop along the pipe equals the supply pressure at the beginning of the pipe. When flow in the pipe is turbulent (flow Reynolds number=mean fluid velocity×pipe diameter÷fluid kinematic viscosity greater than about 2000) this maximum flow rate can be increased by the addition of small amounts of certain high molecular weight linear polymers to the liquid. These polymers interact with the turbulent flow processes and reduce frictional pressure losses such that the pressure drop for a given flow rate is less, or the maximum flow rate for a given pressure drop is larger. This phenomenon is commonly called drag reduction. It has been used in commercial oil pipelines, fire hoses and storm sewers to increase the flow capacities of existing systems. It can also be used to reduce supply pressures, pumping costs, and/or pipe diameters for given flow capacities.

Polymers with very high molecular weight can be used to modify a solvent for a variety of technological applications. In this invention it is disclosed that an alternative to ultra high molecular weight additives are lower molecular weight polymers which are capable of associating in solution, thereby building a network of a very high molecular weight. A way for achieving such networks is the complexation of two dissolved polymers, one having anionic charges along its backbone and the other having cationic charges along its backbone. The complex can be achieved by dissolving each polymer alone in the solvent and combining the two solutions. Altneratively, each polymer can be codissolved in the same solution system. When polymer molecules of opposite charges meet in solution, an interaction occurs between oppositely charged sites forming a complex which involves the associated counterions that may have been present in one or both polymers.

In order to avoid phase separation of the complex in solution, the charge density along the polymer backbones should be relatively low. The resulting solution of such a complex is then significantly more viscous than solutions containing the individual polymers, provided that the total numbers of negative and positive charges are correctly balanced. Upon addition of a strongly polar agent such as water soluble inorganic salts the complex can be disturbed and the viscosity reduced.

It was found that for a given balance of the various parameters that may be varied in an interpolymer complex solution, an unexpected shear thickening (dilatant) behavior may be obtained. These parameters include:
Backbone nature of each of the polymers (or copolymers).
The charge densities along the polymer backbones.
The molecular weight of each polymer.
The ratio between the polymers introduced into solution.
The solvent (and cosolvent, if any).
The concentration of polymer in solution.

As explained above, most solutions of high molecular weight polymers are expected to exhibit a shear thinning behavior. Interpolymer complexes under narrow conditions seem on the other hand to possess an ability to establish even larger networks or act as if networks are larger under high shear rates.

GENERAL DESCRIPTION OF THE INVENTION

The aqueous drag reduction agents of the instant invention are formed by the interaction of a mixture of two different polymers. There are a number of copolymers which are suitable for forming the complexes.

A preferred system is comprised of a mixture of (A) copolymers of acrylamide and a neutralized styrene sulfonate where the sulfonate content ranges from about 0.1 weight percent up to about 50 weight percent and (B) copolymers of acrylamide and a quaternary ammonium salt such as methacrylamidopropylammonium chloride:

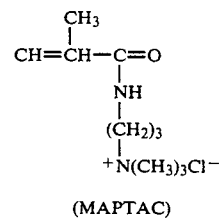

(MAPTAC)

wherein the level of ionic monomer again ranges from about 0.1 weight percent to about 50 weight percent.

Alternatively, a preferred system comprises a mixture in an aqueous solution of a sulfonated copolymer and cationic monomer containing copolymer.

The number of ionic groups contained in the individual copolymers of the polymer complex is a critical parameter affecting this invention. The number of ionic groups present in the polymer can be described in a variety of ways such as weight percent, mole percent, number per polymer chain, etc. For most polymer systems of interest in this invention, it it desirable to employ mole percent. For vinyl homopolymers, such as polyacrylamide, the sulfonated analog having a sulfonate content of 1.0 mole percent means that one out of every 100 monomer repeat units in the polymer chain is sulfonated. In the case of copolymers, the same definition applies, except for the purposes of this calculation, the polymer can be considered to be prepared from a hypothetical monomer having an average molecular weight, which is the average of the two monomer components.

Copolymers (A) and (B) are based on water soluble polymer backbone containing an anionic or cationic comonomer respectively. The nonionic water soluble monomer component of the copolymer (A) and (B) is selected from the group consisting of acrylamide (N, N dimethylacrylamide, alkyl substituted acrylamides, n-vinylactones, methacrylates, vinylpyrolidone, ethylene oxide, vinyl alcohol and methacrylamide and the like, wherein acrylamide is preferred. The anionic comonomer of copolymer (A) is selected from the group consisting of styrene sulfonate, vinyl sulfonate, allyl sulfonate, acrylate, sulfoethylmethylacrylate, acrylicacid, 2-acrylamido-2-methyl propane sulfonic acid, (methyl) acrylic acid, wherein the sulfonate groups are neutralized with an ammonium cation or a metal cation selected from the group consisting of Groups IA, IIA, IB and IIB of the Periodic Table of Elements. The cationic comonomer of copolymer (B) is selected from the group consisting of methacrylamidopropyltrimethylammonium chloride, dimethyldiallylammonium chloride, diethyldiallylammonium chloride, 2-methacryloxy-2-ethyltrimethylammonium chloride, triethylmethacryloxyethylammonium methosulfate, 2-acrylamido-2-methylpropyltrimethylammonium chloride, vinylbenzyltrimethylammonium chloride, and the like. Copolymer (A) or (B) contains about 0.1 to about 50 mole percent of the anionic comonomer, more preferably about 0.5 to about 30 and most preferably about 1 to about 10. The number average molecular weight of copolymer (A), as determined for example by osmotic pressure measurements, is about $10^4$ to about $10^8$, more preferably about $10^5$ to about $10^7$, and most preferably about $10^5$ to about $10^6$. The molecular weight, as derived from intrinsic viscosities, for the copolymers of acrylamide/sodium styrene sulfonate or methacrylamidopropyltrimethylammonium chloride is about $1 \times 10^4$ to about $1 \times 10^8$, more preferably about $1 \times 10^5$ to about $1 \times 10^7$ and most preferably about $1 \times 10^5$ to about $1 \times 10^6$. The means for determining the molecular weights of the water soluble copolymers from the viscosity of solutions of the copolymers comprises the initial isolation of the water copolymers, purification and redissolving the copolymers in water to give solutions with known concentrations at an appropriate salt level (normally sodium chloride). The flow times of the solutions and the pure solvent were measured in a standard Ubbelhode viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well-known Mark-Houwink relationship.

Copolymers (A) and (B) are prepared by a free radical copolymerization in an aqueous medium which comprises the steps of forming a reaction solution of acrylamide monomer and sodium styrene sulfonate monomer or methacrylamidopropyltrimethylammonium chloride monomer (50 wt.% solution in water) in distilled water, wherein the total monomer concentration is about 1 to about 40 grams of total monomer per 100 grams of water, more preferably about 5 to about 30, and most preferably about 10 to about 20; purging the reaction solution with nitrogen; heating the reaction solution to 50° C. while maintaining the nitrogen purge; adding sufficient free radical initiator to the reaction solution at 50° C. to initiate copolymerization of the acrylamide monomer and sodium styrene sulfonate monomer, (or methacrylamidopropyltrimethyl ammonium chloride monomer); to copolymerizing said monomers of acrylamide and sodium styrene sulfonate (or methacrylamidepropyltrimethylammonium chloride) at a sufficient temperature and for a sufficient period of time to form said water soluble copolymer; and recovering said water soluble copolymer from said reaction solution.

Copolymerization of the acrylamide monomer and sodium styrene sulfonate monomer, (or methacrylamidopropyltrimethylammonium chloride monomer) is conducted at a temperature of about 30 to about 90 degrees centigrade, more preferably at about 40 to about 70, and most preferably at about 50 to about 60 for a period of time of about 1 to about 24 hours, more preferably about 3 to about 10, and most preferably about 4 to about 8.

A suitable method of recovery of the formed water soluble copolymer from the aqueous reaction solution comprises precipitation in acetone, methanol and the like.

Suitable free radical initiators for the free radical copolymerization of the acrylamide monomer, and sodium styrene sulfonate monomer, (or the methacrylamidopropyltrimethylammonium chloride monomer) are selected from the group consisting of potassium persulfate, ammonium persulfate, benzoyl peroxide, hydrogen peroxide, and azobisisobutyronitrile and the like. The concentration of the free radical initiator is about 0.001 to about 2.0 grams of free radical initiator per 100 grams of total monomer, more preferably about 0.01 to about 1.0 and most preferably about 0.05 to about 0.1.

It should be pointed out that neither the mode of polymerization (solution, suspension, or emulsion polymerization technique and the like), nor the initiation is critical, provided that the method or the products of the initiation step does not inhibit production of the copolymer or chemically modify the initial molecular structure of reacting monomers.

The interpolymer complex of the anionic copolymer and the cationic copolymer is typically formed by forming a first solution of the anionic copolymer in a aqueous solution. A second solution of the cationic copolymer is formed by dissolving the copolymer in an aqueous solution. The concentration of the anionic copolymer in the solution is about 0.001 to about 10.0 g/dl, more preferably about 0.01 to 5.0 g/dl, and most preferably about 0.1 to 4.0 g/dl. The concentration of the cationic copolymer in the second solution is about 0.001 to about 10 g/dl, more preferably about 0.01 to 5.0 g/dl, and most preferably about 0.1 to 4.0 g/dl. The first solution of the anionic copolymer and the second solution of the cationic copolymer are mixed together, thereby permitting the interaction of the anionic and cationic copolymers to form a water soluble interpolymer complex. Alternatively, both polymers can be simultaneously dissolved in water. The molar ratio of anionic monomer units in the copolymer to the cationic monomer units in the copolymer in the interpolymer complex is about 0.05 to 20, more preferably about 0.1 to about 10, and most preferably about 0.2 to about 5. The concentration of the interpolymer complex drag reduction agent in the aqueous solution can be further reduced to range about 0.0004 to about 10 g/dl, more preferably about 0.001 to about 7, and most preferably about 0.005 to about 5.

An important characteristic of the materials employed in this invention is the stoichiometry of the ionic species when polymers (A) and (B) are blended together. A wide variation in such stoichiometries has been explored wherein the ratio of anionic/cationic species varies from 30/1 to 1/30. An even wider range of from 45/1 to 1/45 for such stoichiometries is believed to be within the scope of this invention.

Accordingly, the preferred ratio of the anionic/cationic can be from about 30/1 to about 1/30.

DESCRIPTION OF THE PREFERRED EMBODIMENTS

The following examples illustrate the present invention without; however limiting the same hereto.

EXAMPLE I

COPOLYMER SYNTHESIS AND COMPLEX PREPARATION

A representative example for the synthesis of the anionically-charged acrylamide (AM) sodium styrene sulfonate (SSS) copolymer is outlined below.

Into a one-liter, 4-necked flask add:
60 mole % acrylamide
40 mole % sodium styrene sulfonate
500 ml. distilled water.

The solution is purged with nitrogen gas for one hour to remove dissolved oxygen. As the nitrogen gas purge began, the solution is heated to 50° C. At this point, 0.05 g potassium persulfate is added to the solution. After 24 hours, the polymer is precipitated from solution with acetone. Subsequently, the resulting polymer is washed several times with a large excess of acetone and dired in a vacuum oven at 60° C. for 24 hours. Elemental analysis shows a sulfur content of 9.13 weight percent, which corresponds to 32.9 mole percent sodium styrene sulfonate.

A representative example for the synthesis of a cationically-charged acrylamide-methacrylamidopropyltrimethylammonium chloride (MAPTAC) copolymer is essentially indentical to the previous polymerization, except for the substitution of SSS for an appropriate quantity of MAPTAC, as presented below.

90 mole % acrylamide
10 mole % MAPTAC (50% solution)

The reaction is carried out utilizing the above specifications. Elemental analysis shows a chlorine content of 1.68 weight percent corresponding to 3.7 mole percent MAPTAC.

As is well-known to those versed in the art, the level of ionic monomers incorporated in the growing polymer chain is directly related to the initial concentration of the reacting species. Therefore, modulation of the ionic charge within the polymer structure is accomplished through changes in the initial anionic or cationic vinylic monomer concentration.

The interpolymer complexes were formed by dissolving the appropriate weight of each copolymer into an aqueous solution to the desired polymer level. The solutions are added together and vigorously mixed. The specific overall charge level within this solution is calculated by assuming that a reaction will take place between all unlike charges leaving any residual charge unaffected. This assumption is quite reasonable since low-charge density copolymers are used in this instant invention.

EXAMPLE II

Drag reduction was evaluated by flowing aqueous solutions through a 2.13 mm inside diameter stainless steel tube and measuring the resultant frictional pressure drop. The solvent was distilled water. Flows were generated by loading a pair of stainless steel tanks (1.1 each) with a previously dissolved aqueous polymer solution, pressurizing the tanks with nitrogen gas (300 kPa), and discharging the solution through the tube test section. Pressure drops were measured across a 48 cm straight segment of the tube with a pair of tube wall pressure taps and a differential pressure transmitter. Flow rates were measured by weighing samples of the effluent liquid collected over measured time periods.

Flow rates in the drag reduction experiments ranged from about 10 to 24 g/s; these corresponded to solvent Reynolds numbers from about 6,500 to 15,000 (solvent Reynolds number = mean flow velocity × tube diameter solvent kinematic viscosity). Drag reduction was measured by comparing pressure drops of the polymer/xylene solutions with pressure drops of the xylene solvent at equal flow rates. Results were expressed as percent drag reduction which is defined as follows:

$$\text{Percent Drag Reduction} = \frac{\left(\text{Pressure Drop (Solvent)} - \text{Pressure Drop (Solution)}\right)}{\text{Pressure Drop (Solvent)}} \times 100$$

Typical drag reduction results from experiments with the interpolymer complex and its individual anionic and cationic components are given in Table I.

TABLE I
Drag Reduction Results for Novel Interpolymer Complex Solution

| Polymer | Polymer Concentration | % Drag Reduction[1],[2] (Solvent Reynolds Number - 12,000) |
| --- | --- | --- |
| AM-Co-SSS | 125 ppm | 12 |
| AM-Co-MAPTAC | 375 ppm | 38[3] |
| AM-Co-SSS + AM-Co-MAPTAC | 125 ppm + 375 ppm | 74 |

[1] All solutions recycled through system until flow degradation of polymers ceased and stable values of flow enhancement obtained.
[2] Values for pressure gradient of 117 kPa/m
[3] Extrapolated from data at 125 and 250 ppm The data indicate that drag reduction was observed for all solutions, but the drag reduction effectiveness improved by forming an interpolymer complex.

The high molecular weight copolymeric materials used in this study appear to be useful as a particular example of a general phenomena. That is, the presence of monomeric units comprising the broad class of water soluble anionic and cationic moieties within the polymer chain are the necessary requirements for drag reduction in aqueous solutions. A stoichiometric amount of these oppositely charged units is not a requirement for effective drag reduction of these latter solutions. In addition, the acrylamide monomer units present within the copolymer structure is only one example of many available water soluble or water dispersible monomer structures.

What is claimed is:

1. A method for reducing the frictional drag of an aqueous solution in flow through a pipe which method comprises adding a quantity of a water soluble polymer complex to said aqueous solution, said water soluble polymer complex comprising:
    (a) a copolymer of a first water soluble polymer backbone and an anionic comonomer; and
    (b) a copolymer of a second water soluble polymer backbone and a cationic comonomer.

2. A method according to claim 1 wherein said first and said second nonionic water soluble polymer backbones are selected form the group consisting of acrylamide, vinyl pyrrolidone, ethylene oxide, vinyl alcohol, methacrylamide, alkyl substituted acrylamides, n-vinylactones, methacrylates, N,N-dimethylacrylamide.

3. A method according to claim 1 wherein said water soluble polymer backbone is polyacrylamide.

4. A method according to claim 1, 2 or 3 wherein:
    (a) said cationic comonomer is selected from the group consisting of N,N,N-trimethylammoniumpropylmethacrylamide, vinyl pyridine methacrylamidopropyltrimethylammonium chloride, dimethyldiallylammonium chloride, diethyldiallylammonium chloride, 2-methacryloxy-2-ethyltrimethylammonium chloride, trimethylmethacryloxyethylammonium methsulfate, 2-acrylamido-2-methylpropyltrimethylammonium chloride, vinylbenzyltrimethylammonium chloride, and the like; and (b) said anionic comonomer is selected from the group consisting of styrene sulfonate, vinyl sulfonate, allyl sulfonate, acrylate and acrylamidoporopyl sulfonate, 2-acrylamido-2-methylpropane sulfonic acid, sodium styrene sulfonate, (meth) acrylic acid, 2-sulfoethylmethacrylate, and the like.

5. A method according to claim 1 or 2, wherein the molar ratio of the cationic comonomer to the anionic comonomer polymer complex is about 45/1 to 1/45.

6. A method according to claim 1 or 2, wherein the molar ratio of the cationic comonomer in the first polymer to the anionic comonomer in the second polymer is about 30/1 to 1/30.

7. A method according to claim 1 or 2, wherein the concentration of the polymer complex in the aqueous solution is about 0.0004 to about 10 grams per 100 ml of said solution.

8. A method according to claim 1 or 2, wherein said aqueous solution is water.

9. A method of claim 1 or 2, wherein the anionic copolymer contains about 0.1 to about 50 mole % anionic monomer units.

10. A method according to claim 1 or 2, wherein the cationic copolymer contains about 0.1 to about 50 mole % cationic monomer units.

* * * * *